United States Patent
Bechhoefer

(10) Patent No.: US 11,138,816 B1
(45) Date of Patent: Oct. 5, 2021

(54) EMBEDDED DETERMINATION OF REMAINING USEFUL LIFE OF A COMPONENT

(71) Applicant: GPMS International, Inc., Cornwall, VT (US)

(72) Inventor: Eric R. Bechhoefer, Cornwall, VT (US)

(73) Assignee: GPMS International, Inc., Cornwall, VT (US)

( * ) Notice: Subject to any disclaimer, the term of this patent is extended or adjusted under 35 U.S.C. 154(b) by 173 days.

(21) Appl. No.: 16/289,766

(22) Filed: Mar. 1, 2019

Related U.S. Application Data

(63) Continuation of application No. 16/271,920, filed on Feb. 11, 2019, now abandoned.

(60) Provisional application No. 62/629,228, filed on Feb. 12, 2018.

(51) Int. Cl.
*G07C 5/08* (2006.01)
*G07C 5/00* (2006.01)

(52) U.S. Cl.
CPC .......... *G07C 5/0808* (2013.01); *G07C 5/006* (2013.01); *G07C 5/085* (2013.01); *G07C 5/0816* (2013.01)

(58) Field of Classification Search
CPC .................................................. G07C 5/0808
See application file for complete search history.

(56) References Cited

U.S. PATENT DOCUMENTS

| | | | | |
|---|---|---|---|---|
| 6,651,012 B1* | 11/2003 | Bechhoefer | ............ | G01H 1/003 382/103 |
| 7,031,812 B1* | 4/2006 | Pettigrew | ................ | B64C 27/06 340/945 |
| 8,725,456 B1* | 5/2014 | Saha | ................... | G05B 23/0283 702/181 |
| 10,410,132 B2* | 9/2019 | Rastogi | .................... | G01L 5/00 |
| 2010/0042287 A1* | 2/2010 | Zhang | .................... | G06Q 10/06 701/31.4 |
| 2012/0022805 A1* | 1/2012 | Teixeira | ............... | A61B 5/7203 702/50 |

(Continued)

OTHER PUBLICATIONS

Jay Lee, Fangji Wu, Wenyu Zhao, Masoud Ghaffari, Linxia Liao, David Siegel, Prognostics and health management design for rotary machinery systems—Reviews, methodology and applications, Mechanical Systems and Signal Processing, vol. 42, Issues 1-2, (Year: 2014).*

(Continued)

*Primary Examiner* — James J Lee
*Assistant Examiner* — Wenyuan Yang
(74) *Attorney, Agent, or Firm* — Shawn Gordon, Esq.; Dunkiel Saunders Elliott Raubgovel & Hand, PLLC

(57) ABSTRACT

A system for determining a remaining useful life of a component is provided that includes an onboard control unit including a processor, a plurality of sensors to detect a plurality of signals from the component, and a data bus connecting the sensors to the onboard control unit. The processor receives data from the plurality of sensors and determines a plurality of condition indicators for the component, a health indicator from the plurality of condition indicators, and a remaining useful life for the component. An alert or warning may be given if the remaining useful life reaches a certain value provided that certain automated reporting conditions are also met.

12 Claims, 9 Drawing Sheets

(56) References Cited

U.S. PATENT DOCUMENTS

| | | | | |
|---|---|---|---|---|
| 2012/0283963 A1* | 11/2012 | Mitchell | ............ | G05B 23/0283 702/34 |
| 2014/0163904 A1* | 6/2014 | Bechhoefer | ........ | G05B 23/0283 702/34 |
| 2015/0330950 A1* | 11/2015 | Bechhoefer | ............ | G01N 29/14 73/587 |
| 2016/0253440 A1* | 9/2016 | Iyengar | .................. | G06F 30/20 703/2 |
| 2017/0183107 A1* | 6/2017 | Brookhart | .............. | G06Q 10/08 |
| 2018/0261022 A1* | 9/2018 | Bechhoefer | ............ | B64D 43/00 |
| 2019/0080524 A1* | 3/2019 | Tucker | ................. | G07C 5/0841 |

OTHER PUBLICATIONS

Wikipedia contributors, Alpha beta filter, Wikipedia (Year: 2017).*

"Condition Based Maintenance Systems for US Army Aircraft", ADS-79D-HDBK, Aeronautical Design Standard Handbook, Mar. 7, 2013.

Bechhoefer, et al., "A Review of Time Synchronous Average Algorithms", Annual Conference of the Prognostics and Health Management Society, 2009.

Bechhoefer, et al., "Gear Health Threshold Setting Based on a Probability of False Alarm", Annual Conference of the Prognostics and Health Management Society, 2011.

Bechhoefer, et al., "Improving the Safety Management System Through HFDM", 73rd Annual Forum & Technology Display, Fort Worth, Texas, USA, May 9, 2017.

Bechhoefer, et al., "Rotor Track and Balance Improvements", Annual Conference of Prognostics and Health Management Society 2013, 2013.

Federal Aviation Administration, "Flight Operational Quality Assurance", Advisory Circular published by the Federal Aviation Administration, Apr. 12, 2004.

Paris, et al., "A Rational Analytic Theory of Fatigue", The Trend in Engineering, 13, 1961, 9-14.

Schlanbusch, et al., "Low Computation Acoustic Emissions Structural Health Monitoring Through Analog Signal Pre-Processing", Annual Conference of the Prognostics and Health Management Society, Aug. 18, 2017.

Večeř, et al., "Condition Indicators for Gearbox Condition Monitoring Systems", Acta Polytechnica vol. 45 No. Jun. 2005, Jun. 2005.

* cited by examiner

EMBEDDED DETERMINATION OF REMAINING USEFUL LIFE OF A COMPONENT

RELATED APPLICATION DATA

This application is a continuation of U.S. application Ser. No. 16/271,920, which is titled "Embedded Determination of Remaining Useful Life of a Component", was filed on Feb. 1, 2019, and claims the benefit of U.S. Provisional Application No. 62/629,228 titled "Embedded Determination of Remaining Useful Life of a Component" and filed on Feb. 12, 2018, each of which is incorporated herein in its entirety.

FIELD OF THE INVENTION

The present invention generally relates to monitoring component health. In particular, the present invention is directed to an embedded determination of the remaining useful life of a component.

BACKGROUND

Estimating the remaining useful life (RUL) of components in systems, and especially in critical systems, such as aircraft, can assist in determining when a component must be repaired or replaced. This allows systems to be operated more safely and with fewer unscheduled interruptions, as well as allowing maintenance to be performed more efficiently. In order to realize these benefits, however, estimates of RUL of components must be reliable and accurate. Further, such estimates must be provided at appropriate times (e.g., not too soon or too late), and implementation must not be overly complex or require expensive or heavy additional equipment.

SUMMARY OF THE DISCLOSURE

An exemplary aspect of the present disclosure provides an improved processing system for evaluating the condition of a component under observation, including a sensor coupled to the component so as to provide a signal, the signal containing information related to the activity of the component and an embedded microcontroller in electronic communication with the sensor. The embedded microcontroller includes a processor and a non-transitory memory, and the processor is configured to execute a set of instructions that reduce the processing power and non-transitory memory required in order to determine a remaining useful life of the component. The set of instructions determine a regime that the component is operating in, collect the signal from the sensor when in an appropriate regime, recover a plurality of health indicator values and a plurality of remaining useful life values from the memory, update the plurality of health indicator values, update the plurality of remaining useful life values based upon the update of the plurality of health indicator values, filter the plurality of health indicator values using an alpha-beta filter, filter the plurality of remaining useful life values using an alpha-beta-gamma filter, and store the updated plurality of health indicator values, filtered plurality of health indicator values, updated remaining useful life values, and the filtered plurality of user life values in the memory.

In another exemplary embodiment, a bused monitoring system for a vehicle is provided that includes an onboard control unit and a plurality of data buses, each of the plurality of data buses being connected to the onboard control unit and being separate from each other of the plurality of data buses. A first one of the plurality of data buses collects vehicle engine parameter data, a second one of the plurality of data buses collects rotor track and balance data, and a third one of the plurality of data buses collects data for determining a remaining useful life for a component. The onboard control unit receives data about a component from at least one of the plurality of data buses and determines a plurality of condition indicators for the component based on the data, a health indicator for the component based on the plurality of condition indicators, and a remaining useful life (RUL) for the component based on the health indicator.

In another exemplary embodiment, an embedded system for monitoring a component of a vehicle is provided that includes an onboard control unit and a plurality of sensors, each of the plurality of sensors configured to detect a respective one of a plurality of signals from the component. A data bus connects the plurality of sensors to the onboard control unit, which receives data from the plurality of sensors and determines a plurality of condition indicators for the component based on the data, a health indicator for the component based on the plurality of condition indicators, and a remaining useful life (RUL) for the component based on the health indicator.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
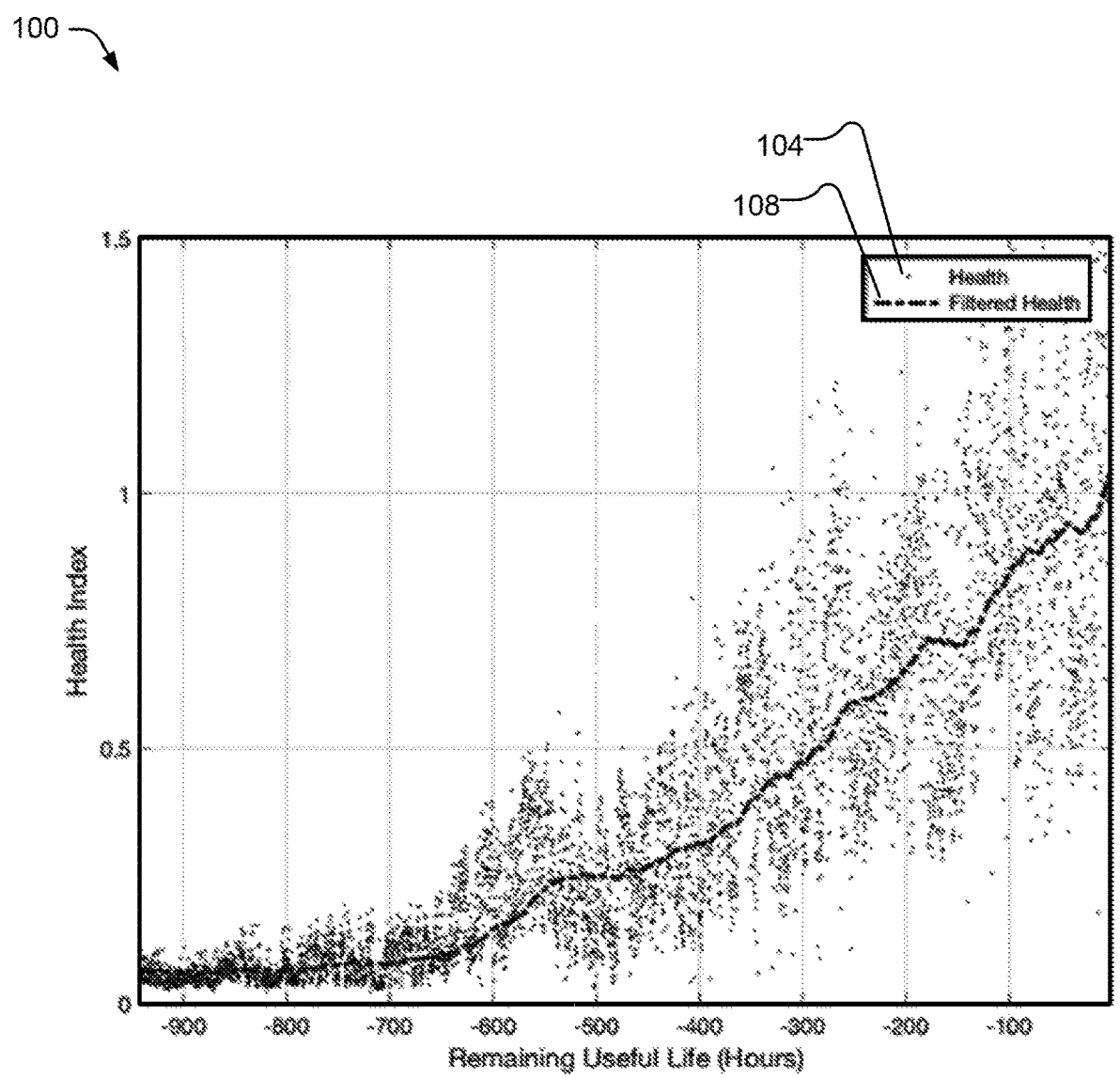
FIG. 1 is a graph showing estimated health index and filtered health index with RUL for a component of a wind turbine.

The present invention generally relates to estimating the RUL of components, such as parts of rotating equipment, using a condition monitoring system that is implemented in an embedded system. Estimating RUL of components in an embedded system can improve safety by reducing time between the occurrence of a fault and the providing of an alert as compared to non-embedded systems, such as server- or desktop-based condition monitoring systems. Further, an embedded RUL capability allows maintenance personnel to encounter a displayed RUL in the vicinity of the component rather than only from a remote monitoring station. In addition, often a significant part of the expense of condition monitoring systems is the installation cost (e.g., installing wire from the component to a remote server) and the software maintenance cost of hosting the condition monitoring on a server for display. The present invention simplifies the condition monitoring system, thereby reducing the costs and weight associated with installing a condition monitoring system. An embedded system also simplifies the process of updating a part of the system or adding new interfaces since the system is scalable.

An embedded system is a computer system with a dedicated function within a larger mechanical or electrical system, often with real-time computing constraints. The embedded systems of the present invention have a dedicated function related to condition monitoring. Condition monitoring is the process of determining the condition of a component based on a measurement or observation of features of the component, or a combination thereof, such as vibrations, acoustic emissions (AE), lubrication analysis, motor current, etc. The features of the component under analysis are then processed to generate condition indicators (CIs) for the component.

CIs are statistically derived representations of the condition of the component under analysis based on measurements of features of the component. For a rotating shaft, for example, CIs might be based on the measure of the first, second, and third order harmonics. Shaft order 1, or the first order harmonic (SO1), is measured to obtain an indication of imbalance. The second order harmonic (SO2) may provide information indicative of a bent shaft. And the third order harmonic (SO3) may provide information indicative of a coupling failure. (In some situations, both the SO2 and SO3 may provide information indicative of a coupling failure.)

Decisions regarding maintenance recommendations can be made based on CIs, often in conjunction with additional a priori configuration data. In some cases, this a priori configuration data is used to describe a threshold setting process, which, with CIs, allows a maintenance event to be recommended.

In general, however, for many components, no single CI can reliably determine the condition of a component. As noted with respect to the rotating shaft example, there are at least three CIs that can be determined and then used in combination to determine the condition of the rotating shaft. Further, reliable determination of the condition of a component requires accurate interpretation of the determined CIs. For example, the thresholds for CIs for one shaft will often be different than the thresholds for the same CIs for another shaft. A shaft with a different mass or rotation rate than another shaft will likely have a different threshold since acceleration is a function of the square of the shaft rate (and acceleration is the second derivative of displacement).

An a priori configuration, if modeled properly, in conjunction with CI information, can be used to derive a representation of the general "health" of a component, which can be designated as a health indicator (HI). The HI is a mapping of CIs (from 1 to n CIs) that combines and scales the CI values into a common threshold nomenclature. Typically, the HI is modeled such that the range of possible HI values goes from 0 to some positive number, where the probability of false alarm (PFA) is set at an HI value exceeding 0.5. On this exemplary scale, a warning alert may be generated when the HI is equal to or greater than 0.75 since an HI greater than 0.75 indicates that maintenance should be planned. The maintenance is scheduled based on an estimation of the RUL the component has until the HI reaches 1.0. An HI of 1.0 or greater indicates an alarm situation, where continued operation with the component will result in a lower reliability of the system, and potentially collateral damage to other components within the system.

While an HI of greater than or equal to 1.0 will result in an alarm alert, under this protocol that HI value does not define a probability of failure for the component within a system. Similarly, this protocol does not constitute a prediction that a component will fail when its HI value reaches 1.0. Rather, these warning and alarm alerts based on HI values are used to suggest a proactive maintenance policy in which maintenance is performed prior to the generation of collateral damage or cascading faults. For example, by performing maintenance on a bearing prior the bearing shedding extensive material, costly gearbox replacement can be avoided.

In many situations, while an HI value greater than 1.0 indicates that a component has a significant enough fault so that maintenance would be appropriate, it is difficult to predict when actual failure of the component will occur. For example, a cracked inner race ring on a bearing is a fault for which it would clearly be appropriate to perform maintenance. Yet a bearing with a cracked inner race ring might continue to operate as part of a working system for tens or even hundreds of more hours before seizing. But sooner or later it will fail, and so a bearing with a cracked inner race ring reduces the overall reliability of any system that it is a component of. For aircraft or other critical systems, acceptable design reliability for individual parts under design loads is typically a probability of failure of less than 1-0.999999 per hour (sometimes referred to as "six-nines," i.e., 99.9999% reliability). For a damaged part, the reliability may be reduced to only 99.9% ("three-nines"), meaning a probability of failure of 1-0.999. The appropriateness to repair the faulted component, then, can also be seen as an action to restore the designed reliability of the system as a whole.

It is not always practical, or possible, to repair or replace any component that is exhibiting less than perfect health. For this reason, an improved estimation of RUL for components is valuable. (As noted, the RUL is the amount of time (or number of cycles) until it is appropriate to perform maintenance on a component.) An estimation of RUL can be made in an embedded system through an alpha-beta tracker (or alpha-beta-gamma tracker) type implementation (discussed in more detail below) on a bused architecture. The estimation of RUL in this system may be based on the following:

an estimate of the health of the component of interest;
an estimate of when maintenance should be performed on that component;
an estimate of the future load for that component; and
a model of the component degradation process that calculates the time (or number of cycles) until maintenance should be performed based on the current health of the component and the estimated future load for the component.

Component Health: Threshold Setting and HI Calculation

As noted, a health index (HI) for a component is based on one or more condition indicators (CIs). Since all CIs, which are derived from measurements of the component, have a probability distribution function (PDF), any operation on the CIs to form an HI is a function of distributions. The HI function is defined as the norm of n CIs (which gives normalized energy). The HI function is valid if and only if the distributions (i.e., the probability distributions of the CIs) are independent and identically distributed (IID).

TABLE 1

Correlation Coefficients for Six CIs of a Gear

| $\rho_{ij}$ | CI 1 | CI 2 | CI 3 | CI 4 | CI 5 | CI 6 |
|---|---|---|---|---|---|---|
| CI 1 | 1 | 0.84 | 0.79 | 0.66 | −0.47 | 0.74 |
| CI 2 | | 1 | 0.46 | 0.27 | −0.59 | 0.36 |
| CI 3 | | | 1 | 0.96 | −0.03 | 0.97 |
| CI 4 | | | | 1 | 0.11 | 0.98 |
| CI 5 | | | | | 1 | 0.05 |
| CI 6 | | | | | | 1 |

Ensuring that the probability distributions are identical can be achieved by, using a Gaussian distribution as an example, subtracting the mean and dividing by the standard deviation for each CI distribution, which will result in identical normal distribution for each CI.

Ensuring that the probability distributions are independent can be more involved. In general, the correlation between CIs for a given component is non-zero. For instance, Table 1 shows the correlation coefficients for six CIs used for a gear fault analysis, many of which are non-zero.

This correlation between CIs implies that for a given function of distributions to have a threshold that operationally meets the design PFA, the CIs must be whitened (i.e., de-correlated). A whitening solution can be found using a Cholesky decomposition. The Cholesky decomposition of a Hermitian, positive definite matrix results in:

$$A = LL^* \quad \text{(Equation 1)}$$

where A is the decomposed matrix, L is a lower triangular, and L* is the conjugate transpose of L. By definition, the inverse covariance matrix ($\Sigma^{-1}$) is a positive definite Hermitian matrix. It then follows that if $$LL^* = \Sigma^{-1} \quad \text{(Equation 2)}$$

then $$Y = L \times CI^T \quad \text{(Equation 3)}$$

where the vector CI is the correlated CIs used for the HI calculation (and $CI^T$ is the transpose of the vector CI) and Y is 1 to n independent CIs with unit variance (where having one CI represents the trivial case). The Cholesky decomposition, in effect, creates the square root of the inverse covariance. This in turn is analogous to dividing the CI by its standard deviation (for the trivial case of one CI). In turn, it can be shown that Equation 3, $Y = L \times CI^T$, creates the necessary independent and identical distributions for the CI required to calculate the critical values for a function of distributions, such as the HI function of distributions.

As an example of the importance of correlation on threshold setting, consider a simple HI function:

$$HI = CI_1 + CI_2 \quad \text{(Equation 4)}$$

The CIs in this example will be normally distributed with mean 0 and standard deviation of 1. The standard deviation of this HI is found with Equation 5:

$$\sigma_{HI} = \sqrt{\sigma_{CI1}^2 + \sigma_{CI2}^2 + 2\rho_{CI1,CI2}\sigma_{CI1}\sigma_{CI2}} \quad \text{(Equation 5)}$$

where $\sigma_{CI1}$ is the standard deviation of $CI_1$, $\sigma_{CI2}$ is the standard deviation of $CI_2$, and $\rho_{CI1,CI2}$ is the correlation between $CI_1$ and $CI_2$. If $\rho_{CI1,CI2}$ is assumed to be 0.0, then the standard deviation of HI, $\sigma_{HI}$, would be 1.414 (i.e., the square root of 2). For a PFA of $10^{-6}$, the threshold is then 6.722. However, if the observed correlation is closer to 1 (e.g., $\rho_{CI1,CI2}$ is 1.0 instead of 0.0), then the observed am would be 2 (square root of 4). In this situation, for a threshold of 6.722, the operational PFA is $4 \times 10^{-4}$, which is 390 times greater than the designed PFA. Thus, correlation between CIs has a significant effect on threshold setting.

The CIs used for condition monitoring have PDFs that are similar to Rayleigh distributions (i.e., they will be heavily tailed). For magnitude based CIs, it can be shown that for the nominal case, the CI PDF is Rayleigh. For gear and bearing CIs, which are magnitude based CIs that are biased by the root mean square (RMS) deviation, a transform is used to make the CIs more Rayleigh-like. The transform "left shifts" the CIs such that a 0.05 cumulative distribution function (CDF) is assigned to 0.0. Consequently, the HI function can be designed using the Rayleigh distribution. The PDF for the Rayleigh distribution uses a single parameter, $\beta$, that defines the mean, $\mu$, as follows:

$$\mu = \beta^*(\pi/2)^{0.5} \quad \text{(Equation 6)}$$

and also the variance, $\sigma^2$:

$$\sigma^2 = (2 - \pi/2)^* \beta^2 \quad \text{(Equation 7)}$$

The PDF of the Rayleigh distribution given by:

$$\text{Rayleigh PDF} = x/\beta^2 e^{-x/(2\beta^2)} \quad \text{(Equation 8)}$$

For the whitening process, $\sigma^2 = 1$, so Equation 7 and Equation 8 can be simplified and the value for $\beta$ for each CI will be:

$$\beta = [\sigma^2/(2-\pi/2)]^{1/2} = 1.5264 \quad \text{(Equation 9)}$$

As noted, the HI function is the norm of n CIs, which represents the normalized energy of the CIs. If the CIs are IID, it can be shown that the HI function defines a Nakagami PDF. The statistics for the HI Nakagami PDF are:

$$\eta = n \quad \text{(Equation 10)}$$

$$\omega = 1/(2-\pi/2)^* 2^* n \quad \text{(Equation 11)}$$

where $\eta$ is the number of IID CIs used in the HI calculation and $\omega$ is the parameter related to the spread.

With these parameters in place, the procedure for calculating thresholds is described below, where the procedure depends in part on the particular type of component being monitored.

Typical components to be monitored include shafts, bearings, and gears. For rotating shafts, CIs may be based on SO1, SO2, and/or SO3. For bearings, CIs may be based on cage energy, ball energy, inner race energy, and/or outer race energy (for journal bearings, whip/whorl is used). If no kinematic data is available, the CIs will be based on shaft rate and average envelope energy. For gears, CIs may be based on residual RMS, residual crest factor (CF), energy operator RMS, Figure of Merit 0 (FM0), AM RMS, and/or FM RMS. However, gears can be complex, and so the determination of CI can be affected by externalities, such as changes in gear-to-gear contact angle, which is affected by torque/twist on the drive train (FM0 in particular is sensitive to this). These factors may require selection of other CI for gears, or reducing the number of CIs used in the HI calculation by eliminating parameters that are known to be unreliable.

For shaft components, the offset index is zero. For bearing or gear components, the offset is calculated using the empirical CDF. The empirical CDF may be obtained from fleet statistics. For example, 50 acquisitions can be used for a minimum of five aircraft under nominal load (which may be defined as >30% torque, for example). Thresholds can be set for fewer aircraft, but this risks increasing the fleet level PFA. Once the empirical CDF are collected, the CI values are sorted. Then the offset is the CDF value that is indexed from the value found by rounding 50*number of aircraft*0.05, in the above example.

Since the thresholds are based on empirical information, more than one release of thresholds may be necessary. For example, a prototype release can be used to capture raw data, find bearing resonance, and check kinematics. An initial release can then be made, preferably to a fleet with at least three aircraft. A final release, based on information gathered based on the initial release, could include 20+ aircraft.

Because a condition monitoring plan is not static, as feedback from depot level repairs/inspections is gathered the thresholds should be updated to reflect operator/maintainer appropriateness for maintenance.

Once the thresholds are determined, the CIs can be used to determine an HI for the component. The mean value and covariance for the component are calculated. The inverse of the covariance is calculated. (Note that a failure at this stage can be the result of a singular matrix, i.e., a matrix that is not a positive definite matrix, which means that two of the CIs are highly correlated. If this is the case, either the sample size is too small, or one of the CIs should be removed from the HI function.)

The Nakagami critical value can then be calculated as follows, with the PFA set at 10e-6, using Equation 11 ($\omega=1/(2-\pi/2)*2*\eta$), where $\eta$ is again the number of CIs used in the HI function. The Critical Value, T, is then the Nakagami Inverse CDF for the values 1-PFA, $\eta$, $\omega$. Then L, the Cholesky Decomposition value of the inverse covariance, is determined. From the Cholesky Decomposition value, L, the Critical Value, T, and the Scale values, S, are calculated from:

$$S=L*(0.5/T)^2 \quad \text{(Equation 12)}$$

S is an upper triangular matrix, which is stored as an array along with the offset values.

In this way, the a priori data is generated that is needed to determine an HI for a component. For an embedded system, this data can be used by a main or onboard control unit (OBCU). An example of how the a priori configuration can be implanted on an OBCU is provided below. (The <ci> tag indicates the index of the value to use from the CI value.)

<shaft id="S1" altid=" ">
    <ci>1,2,3</ci>
    <scale>0.8206,0.5805,0.2769,2.2623,0.0443,2.3786</scale>
    <offset>0.0000,0.0000,0.0000</offset>
    </shaft>
    <gear id="GR1">
    <ci>2,3,5,7,10,12</ci>
    <scale>0.14,-0.20,-0.01,0.05,-0.1,-0.06,0.17,-0.01,-0.04,0.22,-0.18,0.01,0.0002,0.0669,-0.0102,0.01,0.24,0.01,1.38,0.01,0.07</scale>
    <offset>2.12,2.12,2.8,5.1,0.08,0.7</offset>
    </gear>
    <bearing id="A">
    <ci>1,2,3,4</ci>
    <scale>0.72,-0.01,-0.2,0.24,0.50,-0.29,-0.17,0.7,0.4,1.4</scale>
    <offset>0.2535,0.2021,0.2310,0.2235</offset>
    </bearing>

Once the HI is calculated for a component, the RUL can be estimated and stored on the OBCU.

Calculation of RUL on an Embedded System

Because of the limited resources available on an embedded system, both in terms of computation speed and memory (RAM), a fast and efficient method is favorable for calculating the RUL of a component. Preferably, an RUL state vector, which incorporates all of the data needed to update the next estimate of RUL, would be calculated and stored on the OBCU. Such an arrangement would be very efficient, as there is no need to process the entire history of the component health in order to estimate the RUL.

Paris's Law relates the stress intensity factor to subcritical crack growth under a stress regime, which provides a fatigue crack growth model for homogenous material. The basic model is:

$$\frac{da}{dN} = D(\Delta K)^m \quad \text{(Equation 13)}$$

where da/dN is the rate of change in the half crack length per cycle, D is a material constant, $\Delta K$ is the range of strain, and m is the crack growth exponent. The range of strain, $\Delta K$, is defined as:

$$\Delta K = 2\sigma\alpha(\pi a)^{1/2} \quad \text{(Equation 14)}$$

where $\sigma$ is the gross strain, generally unknown but proportional to torque, $\alpha$ is some geometric correction factor, again generally unknown, and a is the half crack length, which is proportional to component health. These variables are usually specific for a given material. Simplifying the model by assuming a crack growth exponent as 2 (which is typical for steel), and collapsing the geometric correction factor (an unknown constant) into D, Equation 13 becomes:

$$da/dN = D4\sigma^2\pi a \quad \text{(Equation 15)}$$

where N is the number of cycles. For constant rate machines, such as a helicopter gearbox, N is proportional to time. Taking the inverse of Equation 15 results in:

$$\frac{dN}{da} = (D4\sigma^2\pi a)^{-1} \quad \text{(Equation 16)}$$

Integrating Equation 17 gives the number of cycles, N, from the current state of crack length, $a_0$, to $a_f$, the state of crack length at the end of the remaining useful life:

$$N = dN/da \times a_0 \times (\ln(a_f) - \ln(a_0)) \quad \text{(Equation 17)}$$

The number of cycles, N, is proportional to time. So, if it is assumed that the current health is proportional to the crack length, $a_o$, and, as noted previously, that the RUL is the estimated time from the current HI to an HI of 1 (where an HI of 1 occurs when $a_f=1$), then the RUL can be determined by:

$$RUL = -dHI/dt \times HI \times \ln(HI) \quad \text{(Equation 18)}$$

Confidence in the Estimated RUL

The confidence in the RUL estimate can be as critical as the RUL estimate itself. A low confidence would suggest that the RUL should be ignored, while a high confidence should give motivation to implement a maintenance action (while also not having to be as conservative in maintenance procedures when there is a high confidence that ample useful life remains). Further, various alerting or reporting processes can be implemented based in part on RUL confidence. In the extreme, an RUL is not reported if it is of low confidence.

Clearly the operator or maintainer needs a level of confidence in the RUL. Conceptually, confidence relates to model validation. For example, suppose an RUL value for a component at some given time is 100 hours. One hour into the future, the new RUL value is again calculated as 100 hours. In this example, the rate of change of the model is 0 hrs/hr, and, subjectively, the confidence in the model is low since the model has failed to account for consuming one hour of life.

Suppose instead that one hour into the future, the RUL value was calculated to be 90 hours (down from the initial 100 hours). The rate of change in the RUL is −10 hrs/hr. This would also be considered a poor model, and the confidence in the RUL is low because while only one hour of component life has actually been consumed, the model has estimated that 10 hours of component life have been consumed.

Finally, suppose that one hour in the future, the model has determined that the RUL is now 99 hours. The rate of change in the RUL is −1.0 hrs/hr, meaning for the model dRUL/dt=−1. Further, given one additional hour in the future, the model determines that the RUL is 98 hours. In this scenario, the model is finding a consistent rate of change in the RUL of −1 hrs/hr. In this example, importantly, the rate of change of the rate of change (i.e., the second derivative) is zero. Analysis of both the first derivative and the second derivative can provide insight into model validation and confidence. In this last example, the model is indicating that the rate of change is consuming one hour of life of the component for each hour (of use). Conceptually, that is a valid model. Preferably, validation of the RUL model performance is automated within the system.

The estimations of the rate of change of HI (dHI/dt), the rate of change of RUL (dRUL/dt), and the second derivative of RUL ($d^2RUL/dt^2$) may be made using a state observer. A state observer is a model that provides an estimate of the internal state of a given system. While a Kalman filter is one type of state observer, it may not be the most appropriate solution for an embedded system. In an embedded system using a microcontroller, there are limited computation resources as well as constraints on RAM. In a Kalman filter, an estimate of the a posteriori covariance is needed, along with an estimate of the state (e.g., HI, dHI/dt). This increases the computation and memory load on an embedded system, which, for a complex installation with many components, can cause resources of the embedded system to be exceeded.

A Kalman filter can be dynamic in the sense that the measurement of noise, plant noise, and a posteriori covariance can be updated based on real time measurements. However, for practical purposes in most systems these measurements will quickly approach a steady state. If the stationarity of these measurements is assumed (i.e., it is assumed that the noise, plant noise, and update rate are constant), then the performance of a Kalman filter can be obtained using an alpha-beta filter (for two states, the filtered estimate of HI, and dHI/dt), or an alpha-beta-gamma filter (for three states representing RUL, dRUL/dt, and $d^2RUL/dt^2$).

Given the assumption of stationarity, alpha-beta filters and alpha-beta-gamma filters are treated as steady state Kalman filters. As such, assuming the limit as time moves toward infinity, the filter coefficients for the alpha-beta filter (used for HI, and dHI/dt) can be calculated as:

$$\text{error} = HI_{measured} - \begin{bmatrix} HI \\ dHI/dt \end{bmatrix} \times \begin{bmatrix} 1 & 0 \\ 0 & 1/dt \end{bmatrix} \quad \text{(Equation 19A)}$$

$$\begin{bmatrix} HI \\ dHI/dt \end{bmatrix} = \begin{bmatrix} HI \\ dHI/dt \end{bmatrix} + \begin{bmatrix} 1 & 0 \\ 0 & 1/dt \end{bmatrix} \times \begin{bmatrix} \alpha \\ \beta \end{bmatrix} + \text{error} \quad \text{(Equation 19B)}$$

where $\alpha$ and $\beta$ are derived from the process variance, which is $\sigma_\omega^2$, and plant noise variance, which is $\sigma_v^2$. The values of $\alpha$ and $\beta$ are determined as follows through the intermediaries $\lambda$ and r:

$$\lambda = \frac{\sigma_w dt^2}{\sigma_v} \quad \text{(Equation 20)}$$

$$r = \frac{4 + \lambda - \sqrt{8\lambda + \lambda^2}}{4} \quad \text{(Equation 21)}$$

$$\alpha = 1 - r^2 \quad \text{(Equation 22)}$$

$$\beta = 2(2-\alpha) - 4\sqrt{1-\alpha} \quad \text{(Equation 23)}$$

The coefficients for the alpha-beta-gamma filter (namely $\alpha$, $\beta$, and $\gamma$, which are needed for RUL, dRUL/dt, and $d^2RUL/dt^2$) can be determined as follows through the intermediaries $\lambda$, b, c, p, q, v, z and s:

$$\lambda = \frac{\sigma_w dt^2}{\sigma_v} \quad \text{(Equation 24)}$$

$$b = \frac{\lambda}{2} - 3 \quad \text{(Equation 25)}$$

$$c = \frac{\lambda}{2} + 3 \quad \text{(Equation 26)}$$

$$p = c - \frac{b^2}{3} \quad \text{(Equation 27)}$$

$$q = \frac{2b^3}{27} - \frac{bc}{3} - 1 \quad \text{(Equation 28)}$$

$$v = \sqrt{q^2 + \frac{4q^3}{27}} \quad \text{(Equation 29)}$$

$$z = -\sqrt[3]{q + \frac{v}{2}} \quad \text{(Equation 30)}$$

$$s = z - \frac{p}{3z} - \frac{b}{3} \quad \text{(Equation 31)}$$

$$\alpha = 1 - s^2 \quad \text{(Equation 32)}$$

$$\beta = 2(1-s)^2 \quad \text{(Equation 33)}$$

$$\gamma = \frac{\beta^2}{2\alpha} \quad \text{(Equation 34)}$$

The calculation of the RUL and a measure of confidence of the calculated RUL can be summarized by the following process. First, if the component state file is empty, initialize the filtered HI (fHI), its derivative (dHI), the filtered RUL (fRUL), and the first and second derivatives of RUL (dRUL, d2RUL) to zero, or, if the component state file is not empty, read the component state from the component state file.

Then if the first RUL estimation is available from start up, initialize the alpha1 and beta1 coefficients based on the measurement noise, the plant noise, and the update rate, dt. Otherwise, retrieve those values from memory. If the first RUL estimation is available from start up, initialize the alpha2, beta2 and gamma2 coefficients based on the measurement noise, the plant noise, and the update rate, dt. It is assumed that the coefficients alpha1, beta1, alpha2, beta2, and gamma2 are initialized at start up and persist throughout the operation.

Update the HI

Recover fil, dHI, fRUL, dRUL, and d2RUL for the component state file. Then update as follows:

$$fHI=fHI+dHI*dt;$$

$$rk=HI-fHI;$$

$$fHI=fHI+alpha1*rk;$$

$$dHI=dHI+(beta1*rk)/dt;$$

Calculate the RUL $$RUL=-1/dHI*fHI*\log(fHI) \quad \text{(Equation 35)}$$

It is assumed in this calculation that the monitored parts or components do not "heal" or improve over time. Hence dHI is always greater than zero. In general, the minimum value of dHI is 1/mean time between failure, or 1/design life.

Filter the RUL

The RUL is then filtered via the following pseudo code, for example:

$$fRUL=fRUL+dRUL*dt+d2RUL*dt*dt/2;$$

$$rk=RUL-fRUL;$$

$$fRUL=fRUL+alpha2*rk;$$

$$dRUL=dRUL+beta2*rk/dt;$$

$$d2RUL=d2RUL+gamma2*rk/(2*dt*dt);$$

update the component state file.

These determinations are made for each component monitored for each acquisition of data. After each component update, the corresponding component state file is updated with values for HI, fil, dHI, RUL, fRUL, dRUL and d2RUL. Additionally, similar to a CI file, an HI/RUL file entry is appended with the current component state, which may be accomplished as follows:
<time>20171107T125006Z</time>
<health code='S1' valid='0' cnt='6'><hi= '0.06'/><fhi='0.063'/><dhi='0.001'/><rul= '3496'/><frul='3501'<drul='-0.007'/><d2rul='- 0.00018'/></health>

In this way, the component health and RUL can be viewed, along with component CI values, on a user interface or browser user interface, during the mission, after the mission, or after periodic download.

Wind Turbine Example

A bused smart sensor system was installed on a 2.1 MW wind turbine to monitor the main shaft. A six second data acquisition was made every 10 minutes, with periodic (1 hour) data download. The HI methodology for thresholding, as described above, was utilized and maintenance was scheduled when the HI was greater than 1.0. An inspection was made when the HI was at a value of 1.1, and that inspection indicated an inner race crack that spanned the width of the race.

FIG. 1 is a graph 100 showing estimated HI 104 and alpha-beta filtered HI 108 against RUL for a component of the wind turbine. Note that a fault starts to propagate at approximately time −700 hours, which corresponded to a time with the presence of high loads from a winter storm.

Figure 2:
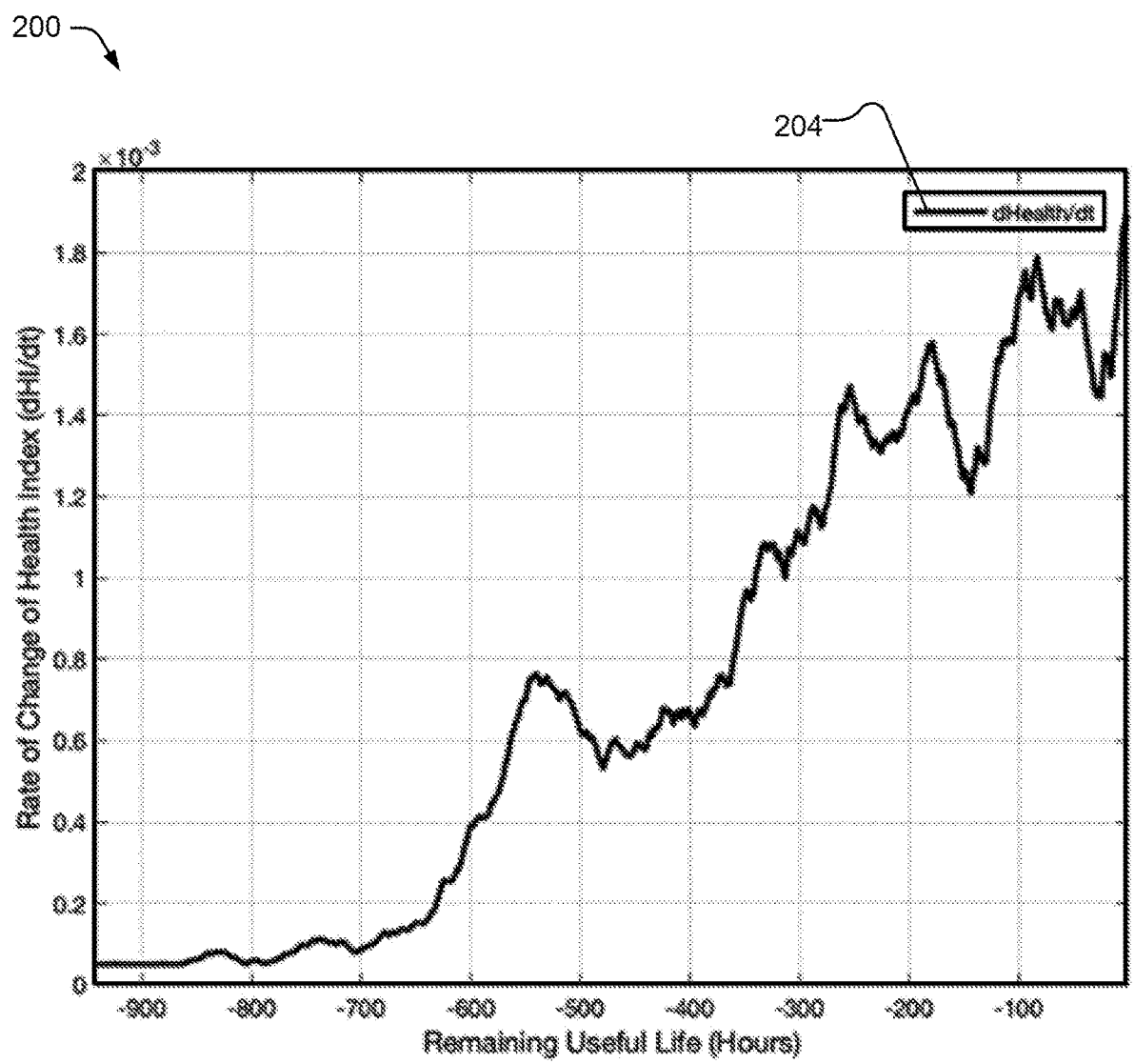
FIG. 2 is a graph of the rate of change of the health index against RUL for the component of the wind turbine.
Figure 3:
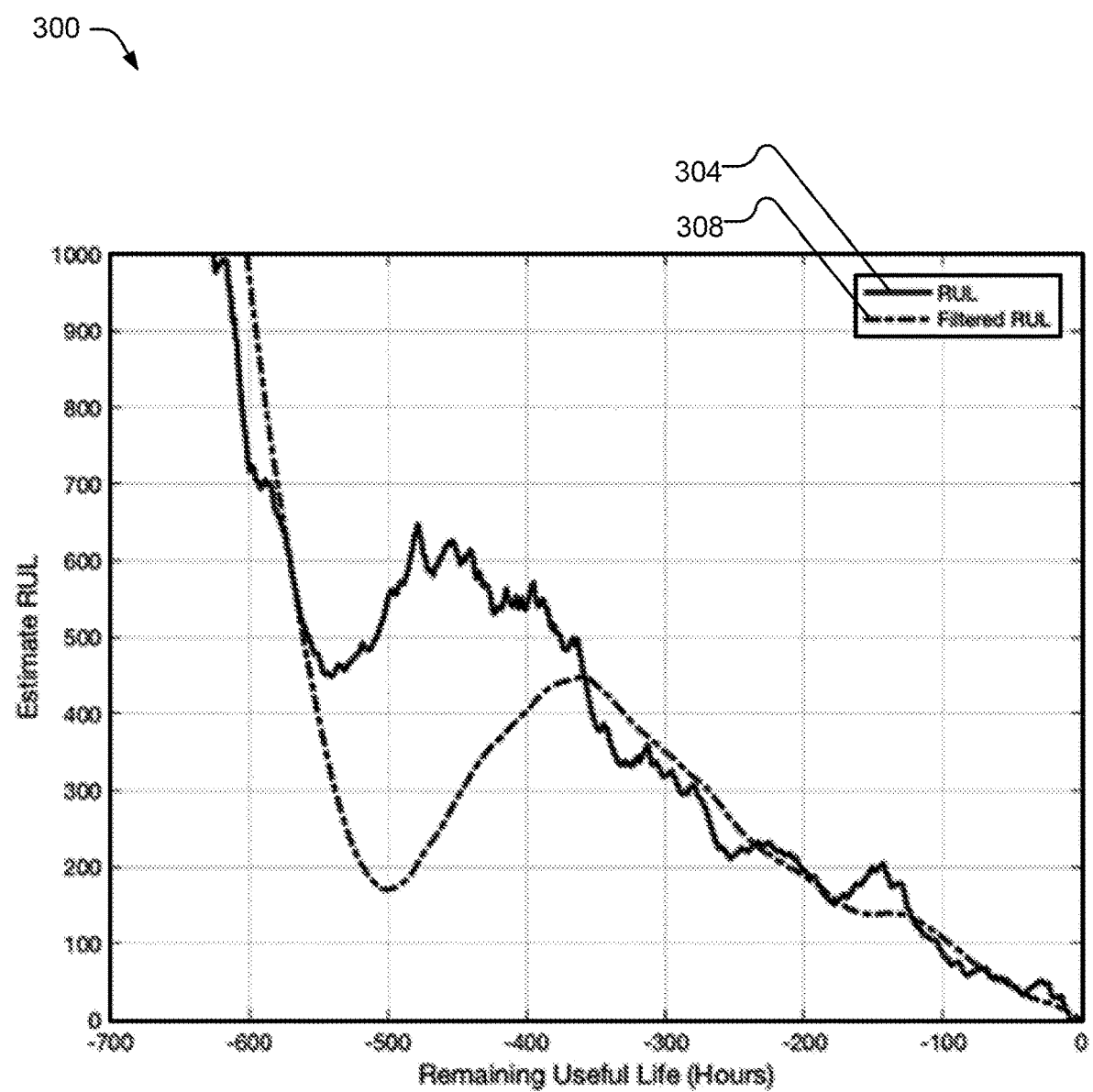
FIG. 3 is a graph comparing estimated RUL and estimated filtered RUL for the component of the wind turbine.

FIG. 2 is a graph 200 of the rate of change of the health index, dHI/dt 204, against RUL for the component of the wind turbine. FIG. 3 is a graph 300 comparing estimated RUL 304 and estimated filtered RUL 308 for the monitored component of the wind turbine. Note that before −700 hours, the RUL is effectively infinite, but once the fault starts to propagate, the RUL reduces quickly. As can be seen (from hour −600 to −400), the filtered RUL is subject to phase lag, which is a phenomenon of all recursive filters. This can be mitigated by the use of a forward/backward, zero phase filter, such as a Kalman Smoother, at the expense of computation burden. This extra computation burden may be enough to exceed the resources available on an embedded system. In this application, the effect of phase lag, as will be shown, is minimal, so that the use of an alpha-beta-gamma tracker remains plausible on an embedded system.

Figure 4A:
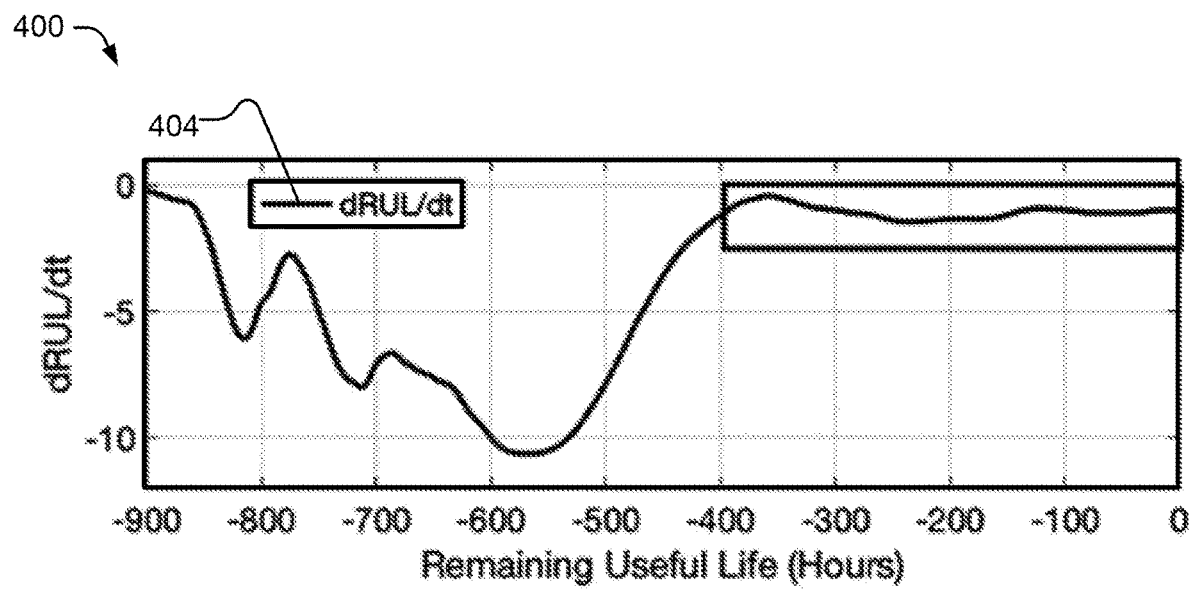
FIG. 4A is a graph of the first derivative of the estimated RUL of the component of the wind turbine.
Figure 4B:
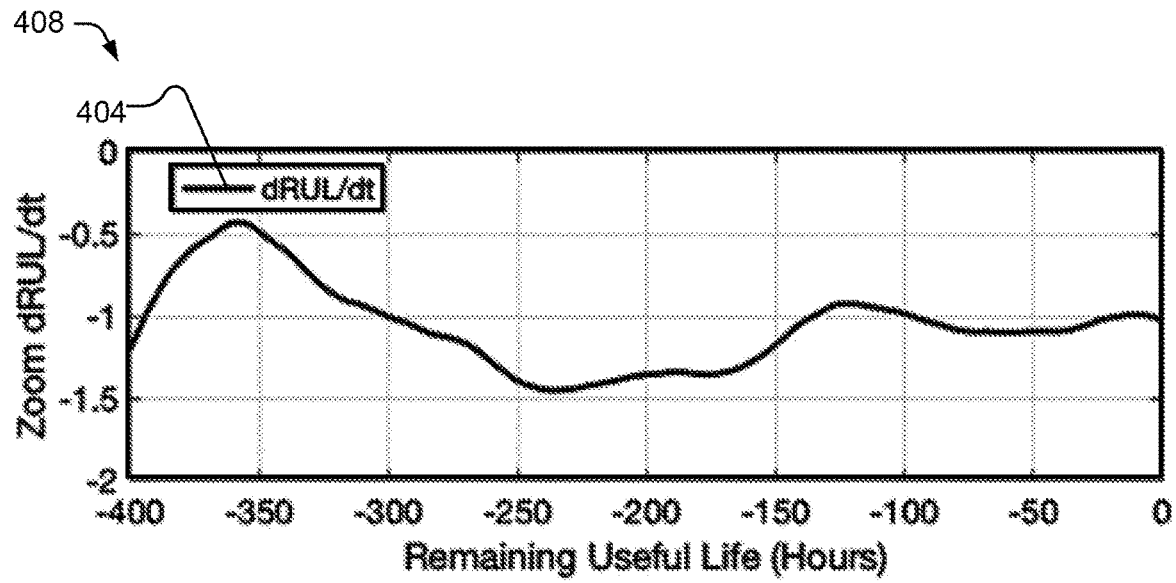
FIG. 4B is a zoomed view of a portion of the graph shown in FIG. 4A.

FIG. 4A is a graph 400 of the first derivative, dRUL/dt 404, of the estimated RUL of the monitored component of the wind turbine. FIG. 4B is a subplot 408 of FIG. 4A from −400 to 0 hours. As can be seen, dRUL/dt 404 has a value of approximately −1 from −400 to 0 hours.

Figure 5A:
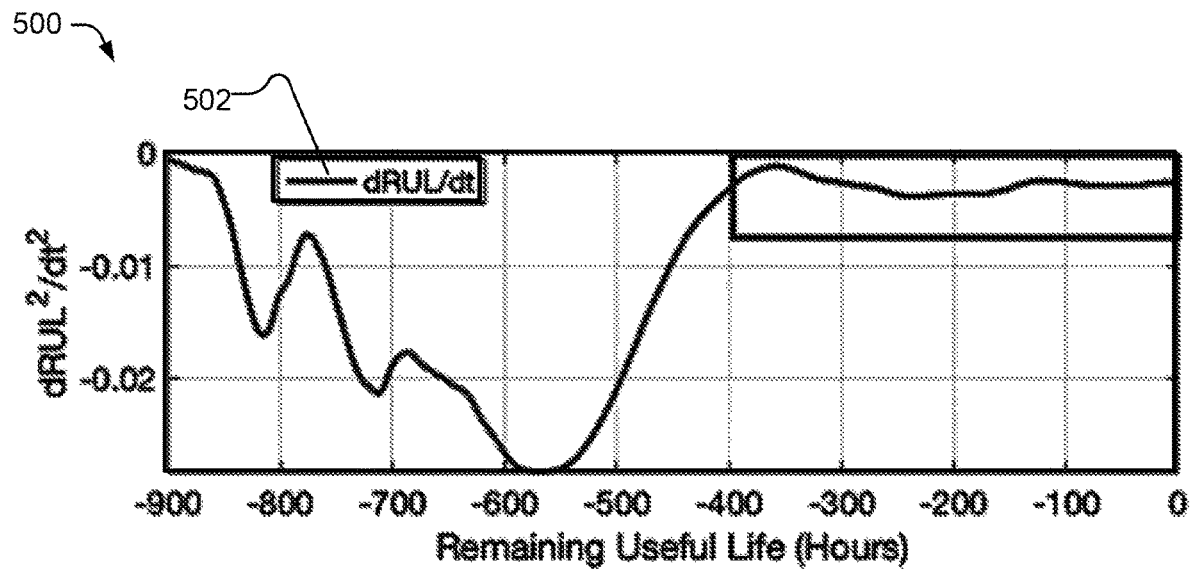
FIG. 5A is a graph of the second derivative of the estimated RUL for the component of the wind turbine.
Figure 5B:
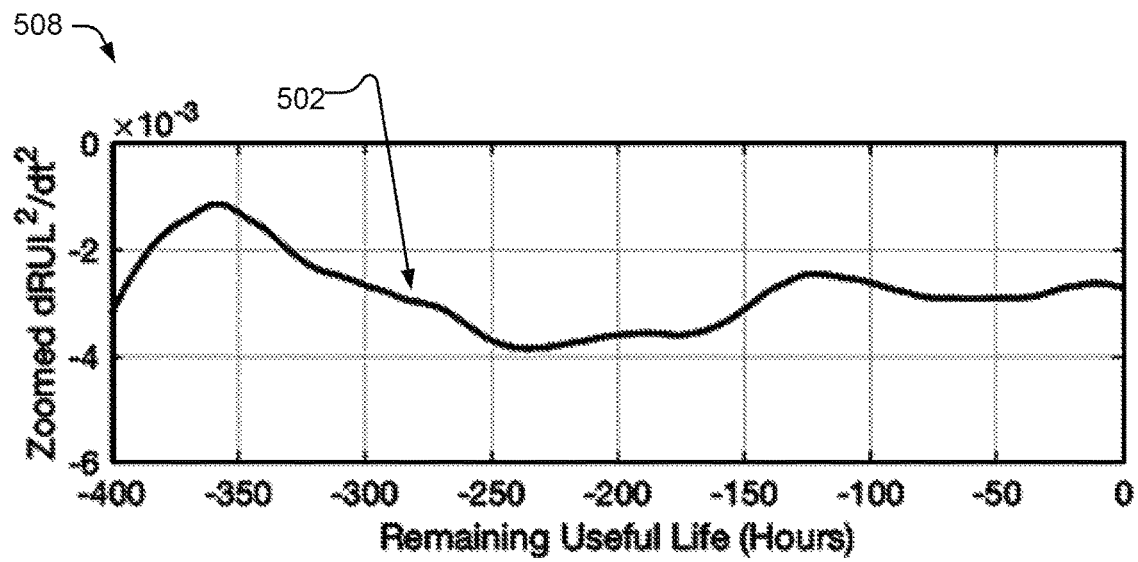
FIG. 5B is a zoomed view of a portion of the graph shown in FIG. 5A.

The second derivative 502 of estimated RUL for the monitored component of the wind turbine is shown in the graph 500 of FIG. 5A. FIG. 5B is a subplot 508 of FIG. 5A from −400 to 0 hours. As can be seen, second derivative 502 of RUL, $d^2RUL/dt^2$, has a value of approximately −0.002 from −400 to 0 hours. Taken together, the first and second derivatives in FIGS. 4A-5B suggest that the model does not converge to high confidence until after the phase lag becomes nominal in the RUL.

Rules for Automated Reporting

Because operators, pilots, and maintainers are often pressed for time, alerts based on HI or RUL should preferably only be made for relevant and pertinent issues related to the health of monitored components. As such, while a system may monitor many components, and the HI and RUL may be updated often, only data that is of concern (e.g., data indicating that components are in warning or alarm territory) and/or with valid (high confidence) RUL, should be displayed or alerted. A number of rules can be used to allow for automating the reporting of appropriate information. The below are examples of such rules, which may be modified depending on particular systems and experiences.

Provide updates, warnings, and alerts based only on a valid/high confidence RUL. An estimated RUL may be said to be a valid/high confidence RUL if the dRUL/dt is between about 0 and −2 per hour (i.e., near −1) and the $d^2RUL/dt^2$ is small, e.g., has an absolute value of about less than 0.01.

Provide a warning alert when the HI is greater than 0.75 and the RUL is valid and less than some nominal amount, such as 100 hours.

Provide an alarm alert if the HI is greater than 1.

Figure 6:
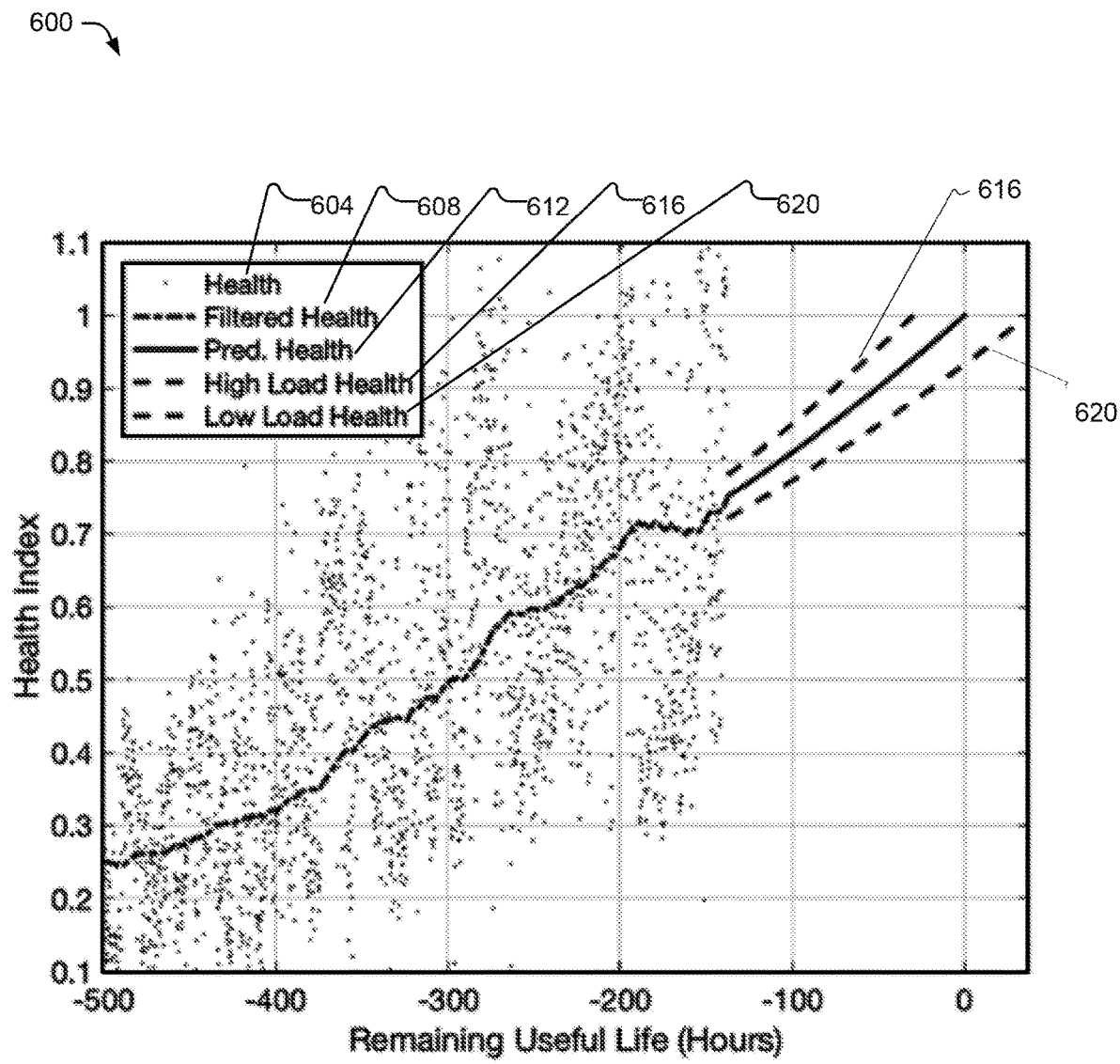
FIG. 6 is a graph of data from a monitored component of the wind turbine that includes measured health, predicted health, filtered health, and confidence limits indicated by a high load health and a low load health.

These warnings and alerts can be extinguished if acknowledged by the operator, maintainer, or pilot, as per effective human factors engineering requirements. As shown in FIGS. 4A-5B, the dRUL/dt and $d^2RUL/dt^2$ meet the criterion for a valid RUL model at approximately 450 hours prior to the HI reaching 1. Under the above suggested reporting rules, however, a warning alert would not be issued until 138 hours prior to the HI reaching 1. FIG. 6 shows a graph 600 of data from a monitored component of the wind turbine that includes measured health 604, filtered health 608, predicted health 612, and confidence limits indicated by high load health 616 and low load health 620.

It will be understood that other variations on these analyses are now possible. While the RUL is calculated based on the mean load measured over the prior sample period, the actual RUL is a distribution function, which is based on projected load (greater or lesser) and the measurement error of the HI. In FIG. 6, confidence limits (namely the high load health RUL of 105 hours, and low load health RUL 174 hours) are based on +/−one standard deviation of the estimated HI, and +/−10% in mean load.

For any estimated RUL, the rate of change in the HI can be calculated as shown in Equation 36:

$$\frac{dHI}{dt} = \frac{-\log(HI)}{RUL\pi}$$ (Equation 36)

Then the estimate for any future $HI_t$ at time t is given by:

$$HI_t = \exp\left(t\pi\frac{dHI}{dt} + \log(HI)\right)$$ (Equation 37)

To estimate the confidence interval, the distribution of the HI and the change in load must be accounted for. For example, in a scenario where the load is 10% higher than average (i.e., an aggressive flight regime) and given that one standard deviation for the HI is calculated as 0.03, the future $HI_t$ would be:

$$HI_t = \exp\left(t\pi\frac{dHI}{dt}1.10 + \log(HI + 0.03)\right)$$ (Equation 38)

Architecture for a Bused, Smart System

In many situations, a decision regarding whether to add condition monitoring to an existing platform, if not mandated, is based on the business feasibility of adding such a system. The business feasibility usually turns on the return on investment of the condition monitoring system. That is, condition monitoring is an investment that reduces the long-term operations and maintenance cost of an asset. The value proposition is based on improved operational availability, improved mission readiness, reduced mission aborts, and overall reduction in the cost of maintenance. While benefits from condition monitoring are well documented, the business case is easier to make if the system is relatively low cost and light weight. In particular for aviation assets, weight may be a prime decision factor in the selection of a condition-based maintenance system.

The cost of a Heath and Usage Monitoring System (HUMS, which is a general term for condition monitoring system on helicopters), and condition monitoring systems in general, is typically based on the number of sensors and the signal condition/signal processing of the data measured by the sensors. Hence, reducing the number of sensors and the signal condition/signal processing cost reduces the cost per channel. In terms of weight, the single largest factor is the interconnects, that is, the weight of the cabling that runs to each sensor. As such, the use of a bused, smart sensor system can greatly reduce the cost and weight of a monitoring system.

Figure 7:
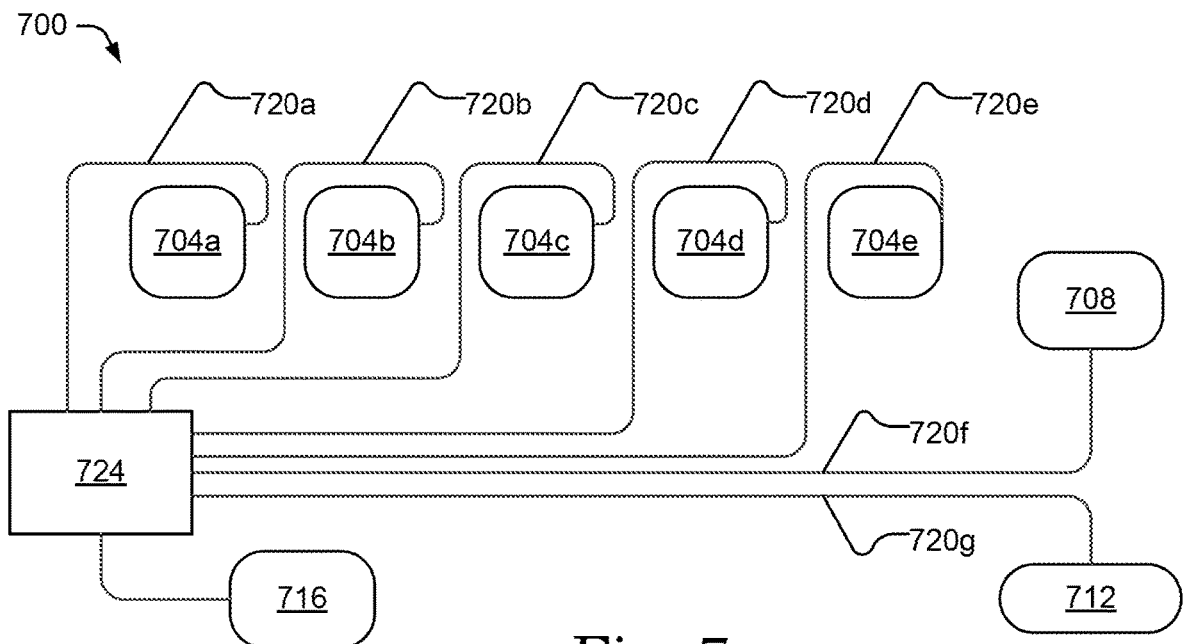
FIG. 7 is a schematic for a star network wired analog sensor system for monitoring the tail boom of a light helicopter.
Figure 8:
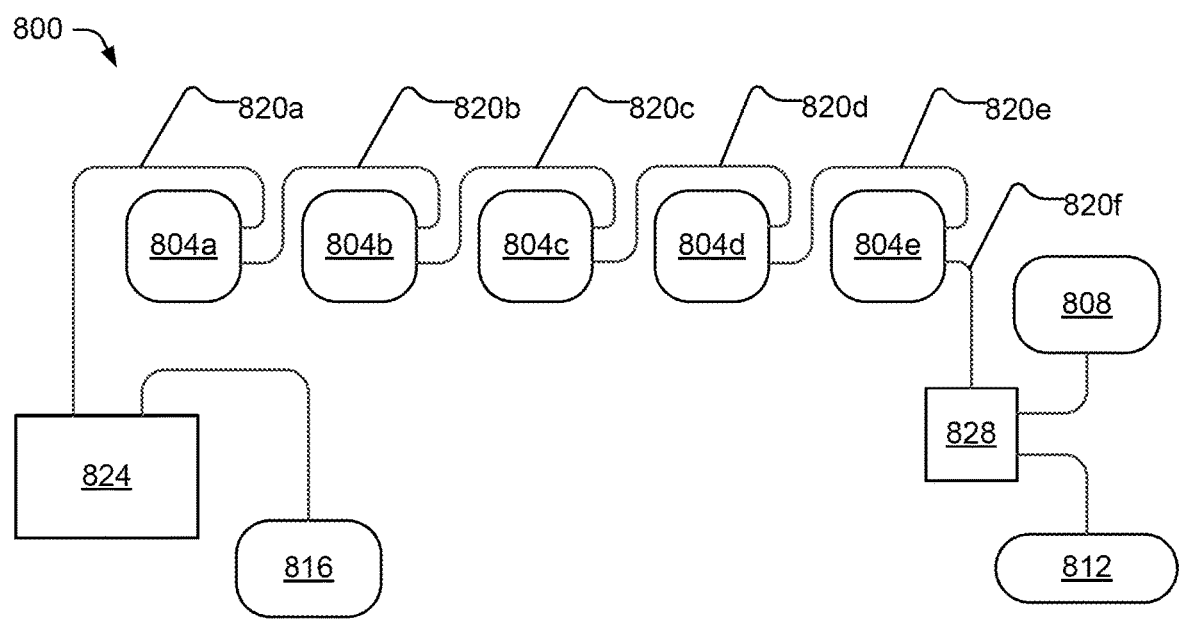
FIG. 8 is a schematic for a bused sensor system for monitoring the tail boom of a light helicopter.

As an example, consider a comparison between monitoring the tail boom of a light helicopter with a "star network" system 700 (a wired analog sensor system) as shown in FIG. 7 and a bused system 800 as shown in FIG. 8. In these examples, each system (700, 800) has five sensors (such as accelerometers) (e.g., 704a-704e and 804a-804e), a tail rotor tachometer interface (708 and 808), and an optical speed sensor (712 and 812), as well as an oil cooler (716 and 816).

For analog ("star network") system 700, each sensor 704 (e.g., 704a-704e) is connected directly back to a bulkhead 724 via a separate harness 720 (e.g., 720a-720e). Optical sensor 712 and tail rotor tachometer interface 708 are likewise directly connected to bulkhead 724 via separate harnesses (720f, 720g, respectively). System 700 may use shielded twisted pair connections, in which case the weight to connect the exemplary set of sensors is estimated to be about 16 lbs.

In bused system 800, each sensor 804 is daisy-chained using a four wire (two power, two twisted pair) shielded harness 820 (e.g., 820a-820e), with a first sensor 804a connected to a harness 820a that runs through a firewall or bulkhead 824 to reach a power supply, etc. Tail rotor tachometer interface 808 and optical sensor 812 are connected to interconnector 828, which is connected to sensor 804e via harness 820f. In this configuration, every connector is the same compact 4 pin interconnect. The weight of the required harness and connectors in this example is approximately ½ lb. Another advantage is that the physical size of the harness does not change, as it would in a traditional system where the cabling bundle increases in size/volume/weight as they are collected together near the after-bulkhead connector. Moreover, in bused system 800, only 8 pins have to pass through bulkhead 824 (as opposed to 32 pins for system 700) so that a smaller hole in bulkhead 824 is required, greatly reducing installation time, expense, and hassle.

Also, in terms of cost, as noted, the number of sensors is important. Traditional analog accelerometers typically cost 10× the cost of comparable micro-electrical mechanical systems (MEMS). MEMS devices have characteristics that are suited for smart sensors, including being designed to surface mount on a printed circuit board (PCB). Even after consideration for packaging, the cost of a MEMS-based smart system channel is approximately $\frac{1}{5}^{th}$ the cost of a comparable traditional analog system.

Some MEMS devices have very high bandwidth and can be used in detection of AE signals. While the description herein is generally involved with vibration associated with rotating equipment, wherein signal processing techniques operate on the vibration data and are used to output a statistical descriptor (e.g., condition indicators) representing the condition of the monitoring component, signal processing of AE signals and determinations of output condition indicators may also be applicable for non-rotating components, such as structures, for which an associated health indicator can be calculated and in turn be used to estimate the remaining useful life.

Another advantage of a bused smart sensor system is that each sensor processes its own data, giving a true parallel computing capability, which allows for low cost microcontrollers to be used instead of a more expensive, higher performance central processing unit (CPU). In addition, with distributed smart sensors, the power supply can be distributed as well. Low power buck converters have efficiencies greater than 90%, which compares favorably to most power supplies that are closer to 70%. Distributing the power supply reduces the heat generated in any given piece of hardware. For the OBCU, this allows the box to be fully sealed, as there is no need for cooling vents or a fan. Further, the OBCU package size can be compact, offering many more options for installation. Finally, the system is more scalable since there is never a need for a redesign to add pins/ports for additional interfaces because an interface is just another sensor on the bus.

In an exemplary embodiment, a smart, bused system for monitoring health of a component in a vehicle, the system includes a plurality of sensors, a tachometer interface, and a bulkhead. Each of the plurality of sensors is connected to another one of the plurality of sensors via four wire shielded harnesses, a one of the plurality of sensors is connected to a four wire shielded harness that passes through the bulkhead, and a second one of the plurality of sensors is connected to the tachometer interface. In this way, the plurality of sensors and the tachometer interface are electrically connected through the bulkhead without additional cabling.

Figure 9:
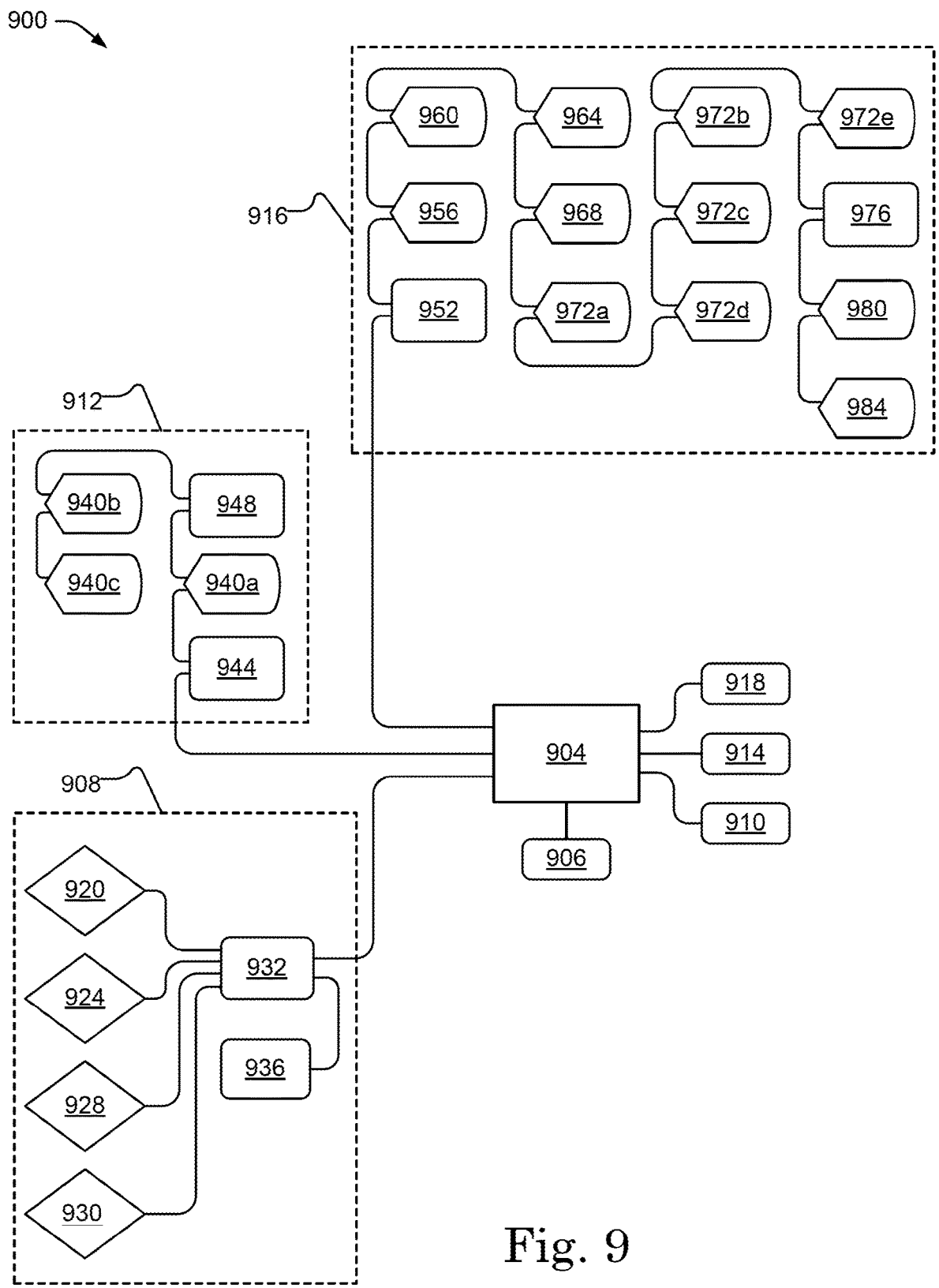
FIG. 9 is a schematic depiction of a bused architecture for an embedded sensor system of the present invention.

FIG. 9 depicts an exemplary architecture 900 of a bused monitoring system of the present invention for a light helicopter. This type of architecture would be similarly appropriate for other mobile or fixed assets. In this architecture, an OBCU 904, which may be connected to aircraft power 906 and include a GPS antenna 910, a WiFi cellular connection 914, and an Ethernet connection 918, is connected to three buses—First Data Bus 908, Second Data Bus 912, and Third Data Bus 916—that support three separate functions.

First Data Bus 908 interfaces with a vehicle for parameter data, both analog and/or digital. Analog data could include the measurements of torque 920, or, for a turbine engine, of turbine outlet temperature. Other engine parameters might include N1 (924), the gas compressor RPM, or N2 (928), the power turbine RPM, or turbine gas temperature (TGT) (930). Digital data can be derived by interface 932 using the ARINC 429 (936) data transfer standard. Other standards that could be used include MIL-STD 1553, ARINC 825 (CAN) bus, or ARINC 717. Parameter data is usually streamed at 4 to 8 Hz to OBCU 904. The data rate is based on the bandwidth of the aircraft itself, and the aircraft physically does not usually maneuver at a rate greater than 2 to 4 Hz (e.g., yaw rate, roll rate, etc.). The data is used for determining the aircraft state (or regime) or to monitor the aircraft for exceedances (such as engine over temperature, over torque, etc.). This data can be stored on OBCU 904 for download, and such data can be used as part of safety related maintenance programs.

Regime data triggers when acquisitions occur on the other two data buses. For example, a common maintenance practice on a helicopter is rotor track and balance (RTB), which is used to reduce vibration and track splint on the rotor system. For this maintenance to be successful, the data should be collected at specific regimes, such as ground, hover, 60 knots forward flight, 100 knots forward flight, etc. Measuring parameter data allows for OBCU 904 to trigger an acquisition of component monitoring data during the appropriate regime to support rotor track and balance events.

Second Data Bus 912 in architecture 900 functions to support data related to rotor track and balance. RTB adjustments include the proper application of weights, pitch control rods, or tab adjustments. While both RTB and analysis of rotating machinery (mechanical diagnostics (MD)) do not require streaming or continuous data collection, and so could be on the same bus, separating them into two buses will likely reduce the total harness weight and offer more flexibility in the OBCU's operation. In this bused example, which is schematically depicted in FIG. 9, Second Data Bus 912 includes sensors 940 (e.g., Fore/Aft sensor 940a, Vert/Fwd sensor 940b, and Vert/Aft sensor 940c), which may be accelerometers at various locations and orientations. The RTB sensors measure the vibration of main and tail rotor, or the main rotor track blade height, and calculate adjustment to those rotors to reduce vibration or track split. While vibration is measured in this system with a smart sensor, track height could be measured with a traditional optical sensor interfaced into a smart sensor, or a smart radar-based sensor. Also included are an MD tachometer 944 and a radar tracker 948.

Third Data Bus 916 is primarily used for the collection of analytic data for RUL calculations. As noted above, several different aspects of components may be monitored/measured in order to generate the previously discussed indications of health and RUL. Examples of these aspects for shafts may include at least the following: Shaft Order 1 (SO1) Magnitude, SO2 Magnitude, SO3 Magnitude, Time Synchronous Average (TSA) RMS, TSA Peak to Peak, and Shaft Speed. The TSA is a fundamental analysis from which many other analyses are performed. For example, SO1 is calculated from the first index of the absolute value of the FFT (fast Fourier transform) of the TSA. The TSA is calculated using tachometer zero crossing data published to the appropriate sensor. The appropriate sensors are indexed and controlled through the use of a priori configuration data as described above, for example. Sensors included in Third Data Bus 916 may be a mechanical diagnostics tachometer 952, an AC drive 956, an input shaft 960, an Eng. GB 964, an oil cool 968, an HB1 972a, an HB2 972b, an HB3 972c, an HB4 972d, an HB5 972e, a tail rotor tachometer 976, a tail rotor axial 980, and a tail rotor radial 984.

Examples of these aspects for gears may include at least the following: Residual RMS, Residual Kurtosis, Energy Ratio, Energy Operator Kurtosis, Figure of Merit 0, Sideband Lifting Factor, Sideband Index, Amplitude Modulation RMS, Amplitude Modulation Kurtosis, Frequency Modulation RMS, Frequency Modulation Kurtosis, and Gear Mesh Energy.

Examples of these aspects for bearings may include at least the following: Cage Energy, Ball Energy, Inner Race Energy, and Outer Race Energy.

To successfully perform these analyses on the smart sensors, an a priori configuration is used to describe the mechanical layout of the gearbox/rotating machinery. Such configuration may be developed in Extensible Markup Language (XML). XML supports a schema system that aids in the referential integrity of the relationship between a smart sensor, a shaft, and/or a gear/bearing on a shaft.

A condition monitoring system has a number of condition analysis modules (CAMs, or smart sensors), which have sample rates and acquisition lengths. The CAMs can be set for acquisition rates and lengths in the manner outlined below, for example, which sets up 50 CAMs:

```
<command index="1" period="2M" channel="3" desc="Perform Acquisition" actcode="ACQ" >
  <cam id="1" sampcode="23438" secs="5" />
  <cam id="2" sampcode="46875" secs="2" />
  <cam id="3" sampcode="93750" secs="2" />
  <cam id="4" sampcode="93750" secs="2" />
  . . .
  <cam id="50" sampcode=" " secs="5" />
  etc.
</command>
```

In the above protocol, the command index 1 performs an acquisition once every two minutes on data bus channel 3.

Cam ID 1, a smart accelerometer, will be commanded to sample at 23438 samples per second for 5 seconds. Cam ID 50 represents a smart tachometer interface, which has no sample rate (as it is designed to measure tachometer zero crossing times at the sensor clock rate), but whose acquisition length is at least as long as the longest accelerometer acquisition time. This is necessary so that a smart accelerometer, coupled with the zero crossing time, can compute the TSA, or provide shaft rate data for bearing analysis.

Each smart acceleration CAM can be as assigned to monitor from 1 to n shafts. Each shaft can have 0 to m gears and 0 to k bearings. The below set up would allow for these conditions:

```
<cam id="1" type="hs-accel" desc="Main Shaft" channel="1">
    <acqcfg><s>184.0</s><sh>S1,S2,S3</sh><w>W1</w></acqcfg>
    <asmcnfg>
    <s i="S1" r="0.0128308710">
    <g i="G13" t="118"/>
    </s>
    <s i="S2" r="0.0469422120">
    <g i="G12" t="41" />
    </s>
    <s i="S3" r="0.0473138380">
    <g i="G11" t="32" b="8" />
    </s>
    <w i="W1"="9000" h="13000" pl="16384" ol="8192">
    <b i="Q" s="S1" cg="0.46" bl="10.77" in="13.54" ou="11.46"/>
    <b i="R" s="S1" cg="0.4" bl="4.16" in="7.2" ou="4.8"/>
    <b i="AE" s="S2" cg="0.53" bl="7.17" in="19.41" ou="13.7"/>
    <b i="AF" s="S2" cg="0.58" bl="13.72" in="17.25" ou="14.59"/>
    </w>
    </asmcnfg>
</cam>
```

CAM1 uses an acquisition configuration <acqcfg> module to define the analysis. The <s> tag sets the scale to convert the MEMS accelerometer data from volts to Gs. The <sh> tag identifies the shafts under analysis for CAM1 (here, shafts S1, S2 and S3), while the <w> tag indicates that the CAM will perform bearing envelope analysis as defined in window W1.

The assembly configuration tag <asmcnfg> performs additional aspects of the analysis. For example, shaft S1 has a ratio of 0.01283 from the tachometer (needed for the TSA), and S1 has a gear, G13, which has 118 teeth (the number of teeth is needed for residual analysis, amplitude modulation analysis, and frequency modulation analysis), and bearings Q and R. Another shaft, shaft S3, has a gear, G2, and bearings AE and AF. Shaft S3, however, has only gear G11, and no bearings. In this example, a single CAM is monitoring ten components. In this way, just a few CAMs are needed to monitor a complex gearbox if each CAM is mounted strategically. Preferably, each CAM on a gearbox is mounted near the components under analysis so that there is a good transfer path for the smart accelerometer to measure the signature of the component.

The tachometer interface sensor can have a similar configuration:

```
<cam id="50" type="tach" desc="MD Tach" channel="3">
    <acqcfg><t>T1</t><sh>S1,S2,S3,S4,S5 </sh></acqcfg>
    <asmcnfg>
    <t i="T1" p="20" rll="1000" r="0.012830871" d="0" s="g" slim="300.0"/>
    </asmcnfg>
</cam>
```

CAM50 is a tachometer sensor interface for data bus 3. The acquisition configuration tag <sh> identifies the recipients of the zero crossing data at the CAMs that are acquiring data for shafts S1, S2, S3, S4, and S5. While CAM 1 is processing data for S1, S2, and S3, another CAM is processing data for S4 and S5. In this way, one tachometer interface sensor can support multiple smart sensors. In FIG. 9, it can be seen that the MD Tach is supporting the analysis of nine smart sensors. More than one tachometer interface can be on a data bus. For example, data bus 3 also has the Tail Rotor (T/R) Tachometer, which supports the T/R Axial and T/R Radial smart sensors.

Operationally, the OBCU can run multiple commands, each one of which is indexed. If at the proper time (e.g., at the end of two minutes), an aircraft is in a regime in which it is appropriate to perform an acquisition of data, the OBCU sends the previously described a priori configuration to each CAM, then commands the CAMs to acquire data. In this way, if a new configuration is uploaded or the configuration is changed on the OBCU, it is assured that the CAMs are performing the correct analysis.

Many other types of CAMs can be controlled by the OBCU. For example, XML configuration for an analog interface would include those tags. Another CAM, CAM70, could create an eight-channel analog interface. Below is an example of how CAM70 could create an eight-channel analog interface:

```
<cam id="70" type="analog" desc="PARAMETERS" channel="1">
    <acqcfg><s>8</s><p>19,20,21,22,23,25</p></acqcfg>
    <asmcnfg>
    <p i="23" ch="3" sc="152.59" os="0" x1="0" x2="0" x3="0" x4="0" x5="0"/>
    <p i="25" ch="4" sc="152.59" os="0" x1="0" x2="0" x3="0" x4="0" x5="0"/>
    <p i="22" ch="5" sc="152.59" os="-0.5" x1="0" x2="0.0" x3="36.2595" x4="0" x5="0"/>
    <p i="20" ch="6" sc="0.003589" os="58.0" x1="0" x2="0" x3="1.426533523" x4="0" x5="0"/>
    <p i="19" ch="7" sc="0.003695" os="60.04" x1="0" x2="0" x3="1.42857142" x4="0" x5="0"/>
    <p i="21" ch="8" sc="0.003723" os="60.4" x1="0" x2="0" x3="1.417434443656981" x4="0" x5="0"/>
    <p i="24" ch="1" sc="0" os="0" x1="-0.1598" x2="207.5215" x3="-3.6362" x4="0" x5="0"/>
    </asmcnfg>
</cam>
```

Here, the acquisition configuration for the analog sensor defines a sample rate of 8 samples per second on data bus 1 channels and will populate parameters 19, 20, 21, 22, 23, 24, and 25. The assembly configuration <asmcnfg> assigns an analog-to-digital converter (ADC) channel to the parameter index. For example, in the above code, ADC channel 3 is assigned to index 23. The analog to digital conversion from ADC counts to volts is the scale value (sc tag), while the conversion from volts (v) to engineering units (eu) is defined by a voltage offset (oc tag) and a fifth order polynomial:

$$eu = x1 + x2*v^{1/2} + x3*v + x4*v^2 + x5*v^3 \quad \text{(Equation 39)}$$

In this way, any measurement can be converted to engineering units as needed for use in regime and exceedance processing.

The OBCU, after commanding an acquisition, retrieves the CI data from each CAM.

Periodically (the period is configurable), the OBCU can also retrieve raw sensor data. Once all of the CI for all the CAMs have been retrieved, the OBCU marshals the data into an XML file. The XML file is saved to persistent media, such as embedded USB, or a non-volatile memory card. The XML file is designed such that the data file is unique. The XML file name contains the asset owner, fleet, asset identifier, and time, preferably UTC time.

The files schema is such that the data is self-documenting. For each CAM for a current acquisition, the XML file contains self-documenting information. This can be accomplished by the following exemplary code:

```
<cam>1</cam>
    <time>20171107T125006Z</time>
    <data>
    <comp code='S1' valid='0' cnt='6'><ci i='1' v=
        '0.074'/><ci i='2' v='0.336'/><ci i='3' v='0.032'/><ci
        i='4' v='2.4242'/><ci i='5' v='0.020'<ci i='6'
        v='193'/></comp>
    <comp code='GR1' valid='0' cnt='12'><ci i='1'
        v='0.18'/><ci i='2' v='2.83'/><ci i='3' v='2.67'/><ci
        i='4' v='0.580'/><ci i='5' v='7.06'/><ci i='6'
        v='3.55'/><ci i='7' v='10.72'/><ci i='8' v='5.66'/><ci
        i='9' v='0.761'/><ci i='10' v='2.37'/><ci i='11'
        v='2.236'/><ci i='12' v='0.0741'/></comp>
    <comp code='Q' valid='0' cnt='5'><ci i='1' v=
        '0.320'/><ci i='2' v='0.203'/><ci i='3' v='0.215'/><ci
        i='4' v='0.286'/><ci i='5' v='0.86'/></comp>
    <comp code='R' valid='0' cnt='5'><ci i='1' v=
        '0.322'/><ci i='2' v='0.218'/><ci i='3' v='0.217'/><ci
        i='4' v='0.22'/><ci i='5' v='0.8618'/></comp>
. . .
</data>
```

In this way, all of the data for every acquisition can be stored locally and downloaded from the OBCU when needed. The download of data for a fixed asset (such as a boiler circulator pump) might be once every 30 minutes. For a mobile asset, such as an aircraft, the download of data could be triggered by an event (e.g., a mishap), could be done periodically, and/or could be done at the end of an operation/flight.

Since the primary functions of the microcontroller(s) of the OBCU are to determine when to acquire data based on regime, to command acquisitions, to retrieve CAM CI or parameter data, and to marshal that data for storage, most of the time these processors will be relatively idle. During these idle times, the OBCU can, based on the collected and stored CI data, determine the component health as described above.

Figure 10:
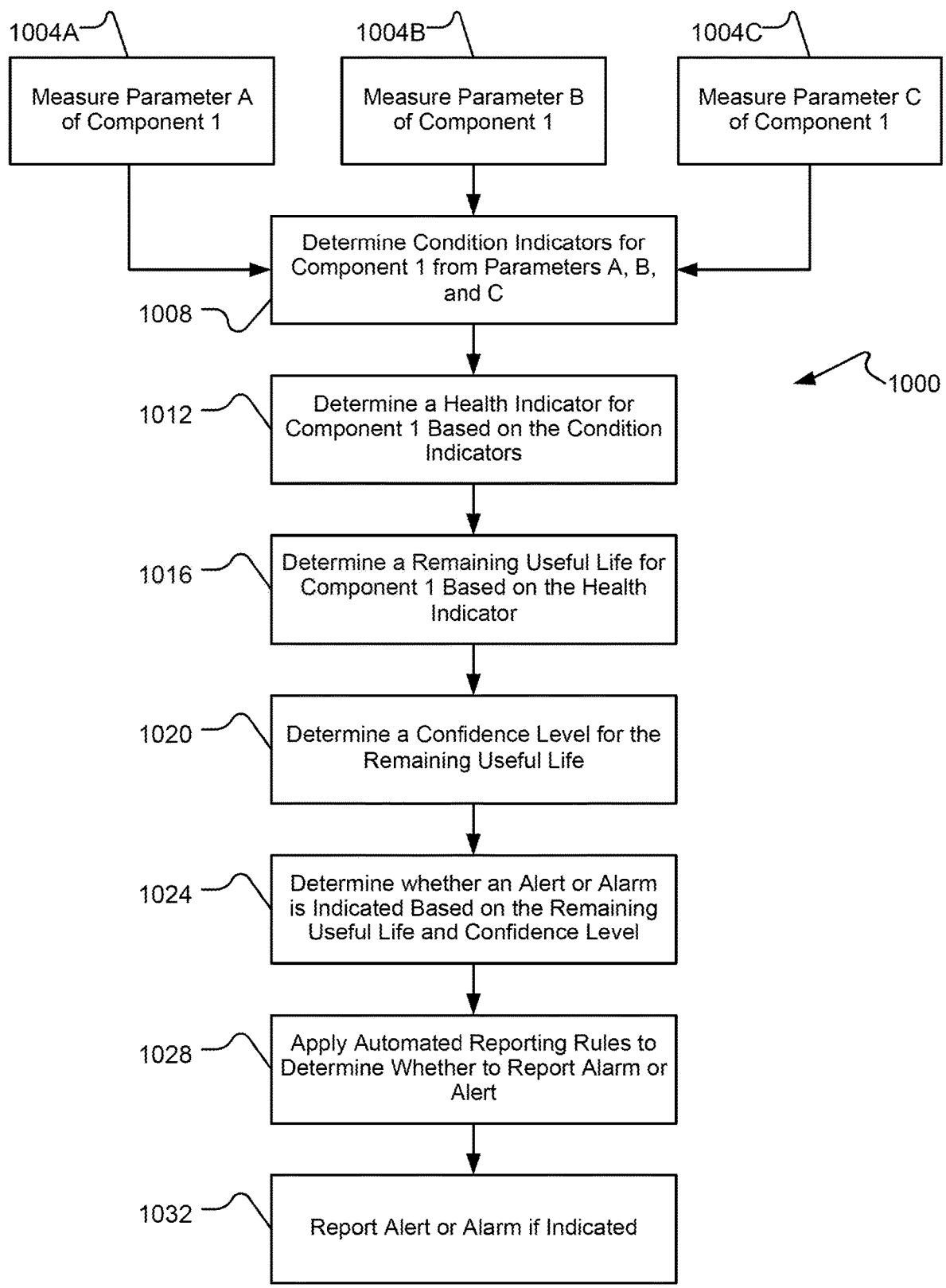
FIG. 10 is a block diagram of a process for determining RUL and reporting related information.

In operation, the embedded system of the present invention executes a process 1000 outlined in FIG. 10 for determining the RUL of a component and reporting alarms and alerts. In step 1004 (e.g., 1004A-1004C), measurements are made of a plurality of parameters of the component to be monitored. (As noted, many components will typically be monitored for a system, but for clarity a single component is discussed with regard to process 1000.) The measurements are used to determine CIs for the component at step 1008, and the CIs are then used to calculate an HI at step 1012. The HI is used to estimate an RUL for the component in step 1016, and a confidence level is determined for that RUL in step 1020. Based on the HI, RUL, and the confidence level, it is determined in step 1024 whether the conditions for an alarm or alert have been met (e.g., HI of 0.75 and/or RUL of less than 100 hours). If the conditions for an alarm or alert have been met, reporting rules are applied at step 1028 to determine whether an alarm or alert signal or message should be sent or whether the estimated RUL should be sent in order to suggest a time frame for scheduling maintenance. At step 1032, the alarm, alert, and/or RUL are reported to appropriate locations.

Examples of Applications for an Embedded Calculation of RUL

There are a large number of applications where an embedded calculation of RUL will be useful for logistic support and asset planning.

In a satellite system, for example, the attitude control may require the use of a reaction wheel. This type of control device is useful because it uses no fuel or rockets for reaction. Such devices are particularly useful for aligning an antenna or camera. The reaction wheel, being a type of flywheel, is a rotating device, which uses bearings. An embedded RUL estimation of the bearing life is helpful to a satellite mission planner since it indicates when the spacecraft needs to be replaced. This knowledge is important for mission critical systems where continuous coverage is important, such as for communication or weather satellites.

In another scenario, consider a boiler circulator pump (BCP) in a power plant. Such pumps are critical for the power plant operation. A failure of a BCP typically causes the power plant to be taken off line, resulting in fines and higher operating cost for the power plant operator. The installation of a condition monitoring system on a BCP can indicate shaft imbalances, wear on the pump bearings, and detect faults within the motor, such as rotor bars, shorts, eccentricity, etc. Any of the aforementioned faults can cause the BCP to fail, resulting in the power plant being taken off line. An embedded RUL calculation could be used to trigger maintenance on the BCP opportunistically (e.g., when the plant is off line for scheduled maintenance), or to allow the operator time to bring other power plants on line to take over the power generation. Further, an embedded RUL capability would allow plant maintenance personnel, in their daily routine of visual inspection, to see an RUL displayed on the BCP itself. This is advantageous in that often part of the expense of a condition monitoring program is the installation cost (e.g., wiring to a remote server) and the software maintenance cost of a hosting the condition monitoring on a server for display.

While helicopter designs are inherently safe, including an embedded RUL capability improves reliability, and therefore, safety. Recently, there have been a number of mishaps on aircraft that included HUMS. While an onboard condition monitoring system is a valuable safety tool, if the data is not processed and viewed routinely, or if the fault propagates in a time period less than the turnaround time of the server/desktop-based condition monitoring systems, the system provides little value to improve safety. An embedded RUL with automated reporting rules to notify the crew of an impending failure would improve safety further.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An improved processing system for evaluating the condition of a component under observation, the system comprising:
    a sensor coupled to the component so as to provide a signal, the signal containing information related to the activity of the component; and an embedded microcontroller in electronic communication with the sensor, the embedded microcontroller including a processor and a non-transitory memory, the processor configured to execute a set of instructions that reduce the processing power and non-transitory memory required in order to determine a remaining useful life of the component:
determine a regime that the component is operating in;
determine whether the regime is an appropriate regime for acquiring data about the component in order to determine a remaining useful life for the component;
acquire data from the signal from the sensor when the regime is determined to be in the appropriate regime and such data has not been previously acquired within a set time period;
recover a plurality of health indicator values for the component and a plurality of remaining useful life values for the component from the memory;
update the plurality of health indicator values based on the data for each acquisition of data;
update the plurality of remaining useful life values based upon the updated plurality of health indicator values for each acquisition of data;
filter the updated plurality of health indicator values using an alpha-beta filter;
filter the updated plurality of remaining useful life values using an alpha-beta-gamma filter; and
store the updated plurality of health indicator values, the filtered plurality of health indicator values, the updated remaining useful life values, and the filtered plurality of remaining useful life values in the memory.

2. The system of claim 1, wherein the appropriate regime is a regime in which the component is under a nominal load.

3. An embedded system for monitoring a component of a vehicle, comprising:
an onboard control unit;
a plurality of sensors, each of the plurality of sensors configured to detect a respective one of a plurality of signals from the component; and
a data bus connecting the plurality of sensors to the onboard control unit,
wherein the onboard control unit determines a regime that the vehicle is operating in, determines whether the regime is an appropriate regime for acquiring data about the component in order to determine a remaining useful life for the component, receives data from the plurality of sensors when the determined regime is the appropriate regime and such data has not been previously acquired within a set time period, and determines:
a plurality of condition indicators for the component based on the data,
a health indicator for the component based on the plurality of condition indicators, and
a remaining useful life (RUL) for the component based on the health indicator.

4. The embedded system according to claim 3, wherein the plurality of sensors in the data bus are daisy-chained using a system of four wire shielded harnesses.

5. The embedded system according to claim 4, wherein the plurality of sensors includes a sensor for a rotating shaft.

6. The embedded system according to claim 3, wherein a confidence level in the determined RUL of the component is determined in the onboard control unit.

7. The embedded system according to claim 6, wherein a warning is provided when the determination of the RUL reaches a predetermined value at a predetermined confidence level.

8. The embedded system according to claim 7, wherein the confidence level is based on values of dRUL/dt and $d^2RUL/dt^2$.

9. The embedded system according to claim 8, wherein an alpha-beta filter is used to obtain filtered states for HI, and dHI/dt and an alpha-beta-gamma filter is used to obtain filtered states for RUL, dRUL/dt, and $d^2RUL/dt^2$.

10. The embedded system according to claim 9, wherein the alpha-beta filter includes an alpha coefficient ($\alpha$) and a beta coefficient ($\beta$), the alpha coefficient and the beta coefficient being derived from a process variance and a plant noise variance and being determined as follows via intermediaries $\lambda$ and r:

$$\lambda = \frac{\sigma_w dt^2}{\sigma_v};$$

$$r = \frac{4 + \lambda - \sqrt{8\lambda + \lambda^2}}{4};$$

$$\alpha = 1 - r^2$$

$$\beta = 2(2-\alpha) - 4\sqrt{1-\alpha}.$$

11. The embedded system according to claim 10, wherein the alpha-beta-gamma filter includes an $\alpha 1$ coefficient, $\beta 1$ coefficient, and $\gamma$ coefficient, which are determined as follows through intermediaries $\lambda 1$, b, c, p, q, v, z and s:

$$\lambda 1 = \frac{\sigma_w dt^2}{\sigma_v}$$

$$b = \frac{\lambda 1}{2} - 3$$

$$c = \frac{\lambda 1}{2} + 3$$

$$p = c - \frac{b^2}{3}$$

$$q = \frac{2b^3}{27} - \frac{bc}{3} - 1$$

$$v = \sqrt{q^2 + \frac{4q^3}{27}}$$

$$z = -\sqrt[3]{q + \frac{v}{2}}$$

$$s = z - \frac{p}{3z} - \frac{b}{3}$$

$$\alpha 1 = 1 - s^2$$

$$\beta 1 = 2(1-s)^2$$

$$\gamma = \frac{\beta^2}{2\alpha}.$$

12. The embedded system according to claim 3, wherein the component is a shaft, gear, or bearing.

* * * * *